(12) United States Patent
Hirzallah et al.

(10) Patent No.: US 12,402,168 B2
(45) Date of Patent: Aug. 26, 2025

(54) TECHNIQUES FOR NORMALIZING NARROW BEAM CHANNEL ACCESS PARAMETERS BASED ON BANDWIDTH IN WIRELESS COMMUNICATIONS

(71) Applicant: QUALCOMM Incorporated, San Diego, CA (US)

(72) Inventors: Mohammed Ali Mohammed Hirzallah, San Diego, CA (US); Ahmed Attia Abotabl, San Diego, CA (US); Marwen Zorgui, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 344 days.

(21) Appl. No.: 17/888,120

(22) Filed: Aug. 15, 2022

(65) Prior Publication Data
US 2024/0057154 A1    Feb. 15, 2024

(51) Int. Cl.
*H04W 74/0808*    (2024.01)
*H04W 72/044*     (2023.01)
*H04W 72/542*     (2023.01)

(52) U.S. Cl.
CPC ..... *H04W 74/0808* (2013.01); *H04W 72/044* (2013.01); *H04W 72/542* (2023.01)

(58) Field of Classification Search
CPC .......................... H04B 7/0617; H04W 72/044; H04W 72/542; H04W 74/0808
See application file for complete search history.

(56) References Cited

U.S. PATENT DOCUMENTS

| | | | |
|---|---|---|---|
| 2020/0112993 A1* | 4/2020 | Tsai | H04W 72/046 |
| 2021/0251002 A1 | 8/2021 | Sun et al. | |
| 2022/0124806 A1 | 4/2022 | Hu et al. | |
| 2022/0287093 A1* | 9/2022 | Iyer | H04B 7/0695 |
| 2023/0015536 A1* | 1/2023 | Goyal | H04B 7/0695 |
| 2023/0072340 A1* | 3/2023 | El Hamss | H04W 74/0833 |

OTHER PUBLICATIONS

International Search Report and Written Opinion—PCT/US2023/070275—ISA/EPO—Nov. 2, 2023.
ZTE, et al., "Framework on Potential Solutions and Techniques for NR-U", 3GPP TSG RAN WG1 Meeting #92, R1-1801466-7.6.4, 3rd Generation Partnership Project, Mobile Competence Centre, 650, Route Des Lucioles, F-06921 Sophia-Antipolis Cedex, France, vol. RAN WG1, No. Athens, Greece, Feb. 26, 2018-Mar. 2, 2018, Feb. 17, 2018, pp. 1-8, XP051397565, section 4.1.1.

* cited by examiner

*Primary Examiner* — Donald L Mills
(74) *Attorney, Agent, or Firm* — ArentFox Schiff LLP (57) ABSTRACT

Aspects described herein relate to adapting one of a parameter for transmitting a signal as a narrow beam in a wireless network or a corresponding threshold based on an operating bandwidth. A node can determine whether a condition is met for narrow beam channel access based on the bandwidth-adjusted (or bandwidth-specific) parameter or threshold.

30 Claims, 6 Drawing Sheets

TECHNIQUES FOR NORMALIZING NARROW BEAM CHANNEL ACCESS PARAMETERS BASED ON BANDWIDTH IN WIRELESS COMMUNICATIONS

BACKGROUND

Aspects of the present disclosure relate generally to wireless communication systems, and more particularly, to narrow beam directional channel access.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, such as 5G NR, millimeter wave (mmWave) and sub-terra hertz (sub-THz) frequencies offer an abundance of unlicensed spectrum bands. Transmission and reception over these bands can be directional, resulting in interference-limited wireless environment. Depending on the operating scenario, performing Listen-Before-Talk (LBT) and/or Long-Term (LT) sensing may not be required before transmission, such as in cases where a narrow beam is used to transmit over the band.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus for wireless communication is provided that includes a processor, memory coupled with the processor, and instructions stored in the memory. The instructions are operable, when executed by the processor, to cause the apparatus to adapt one of a parameter for transmitting a signal as a narrow beam in a wireless network or a corresponding threshold based on an operating bandwidth, and based on comparing the parameter with the corresponding threshold, one of perform a listen-before-talk (LBT) procedure to acquire a channel before transmitting the signal as the narrow beam, or transmit the signal as the narrow beam without performing the LBT procedure.

In another aspect, a method for wireless communication is provided that includes adapting one of a parameter for transmitting a signal as a narrow beam in a wireless network or a corresponding threshold based on an operating bandwidth, and based on comparing the parameter with the corresponding threshold, one of performing a LBT procedure to acquire a channel before transmitting the signal as the narrow beam, or transmitting the signal as the narrow beam without performing the LBT procedure.

In another aspect, an apparatus for wireless communication is provided that includes means for adapting one of a parameter for transmitting a signal as a narrow beam in a wireless network or a corresponding threshold based on an operating bandwidth, and means for comparing the parameter with the corresponding threshold, and based on the comparing, one of performing a LBT procedure to acquire a channel before transmitting the signal as the narrow beam, or transmitting the signal as the narrow beam without performing the LBT procedure.

In another aspect, a non-transitory computer-readable medium including code executable by one or more processors for wireless communication is provided. The code comprising code for adapting one of a parameter for transmitting a signal as a narrow beam in a wireless network or a corresponding threshold based on an operating bandwidth, and comparing the parameter with the corresponding threshold, and based on the comparing, one of performing a LBT procedure to acquire a channel before transmitting the signal as the narrow beam, or transmitting the signal as the narrow beam without performing the LBT procedure.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to normalizing conditions and/or metrics for narrow beam-based channel access based on bandwidth. For example, millimeter wave (mmWave) and sub-terra hertz (sub-THz) frequencies can provide an abundance of unlicensed spectrum bands that can be used for wireless communications. Where a narrow beam is used to transmit signals, listen-before-talk (LBT), long-term (LT) sensing, or other clear channel assessment (CCA) procedures may not need to be performed to acquire a channel for transmission. Rather, the narrow beam may be narrow enough to not cause substantial interference to other communications, and as such communications between different devices may coexist where the beam is narrow enough. In an example, the narrowness of the beam can be measured and determined to satisfy one or more narrow beam conditions in order to be used for such communications. The narrow beam properties, however, may be impacted by bandwidth of the transmission, and as such, aspects described herein relate to normalizing narrow beam conditions or metrics based on bandwidth in determining whether a narrow beam can or should be used for channel access.

Current narrow beam conditions or metrics may be defined in a wireless communication technology standard, such as fifth generation (5G) new radio (NR) and/or for certain operating modes (e.g., 60 gigahertz (GHz) channel access). European Telecommunications Standards Institute (ETSI) currently defines a 60 GHz operation mode 303 753 (known as "C2") that can be applicable to mobile and fixed communications and can allow for skipping LBT at either side with minimum antenna gain requirements (but may require some mitigation technique in absence of sufficient antenna gain). Nodes of the wireless network can change operating bandwidth over time, and in some cases resulting interference when operating with wide beam but larger bandwidth may become more tolerable (e.g., as bandwidth increases and/or beam widens). As such, aspects described herein relate to adapting, based on an operating bandwidth, a parameter or corresponding threshold for transmitting a signal as a narrow beam, and then based on comparing the parameter value to the threshold, performing LBT or refraining from performing LBT before transmitting the signal or otherwise determining whether the narrowband beam condition is met. Considering operating bandwidth, in this regard, can allow for accepting more conditions for using beam-based channel access, which can improve communication throughput for multiple nodes in a wireless network.

The described features will be presented in more detail below with reference to FIGS. 1-6.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

Figure 1:
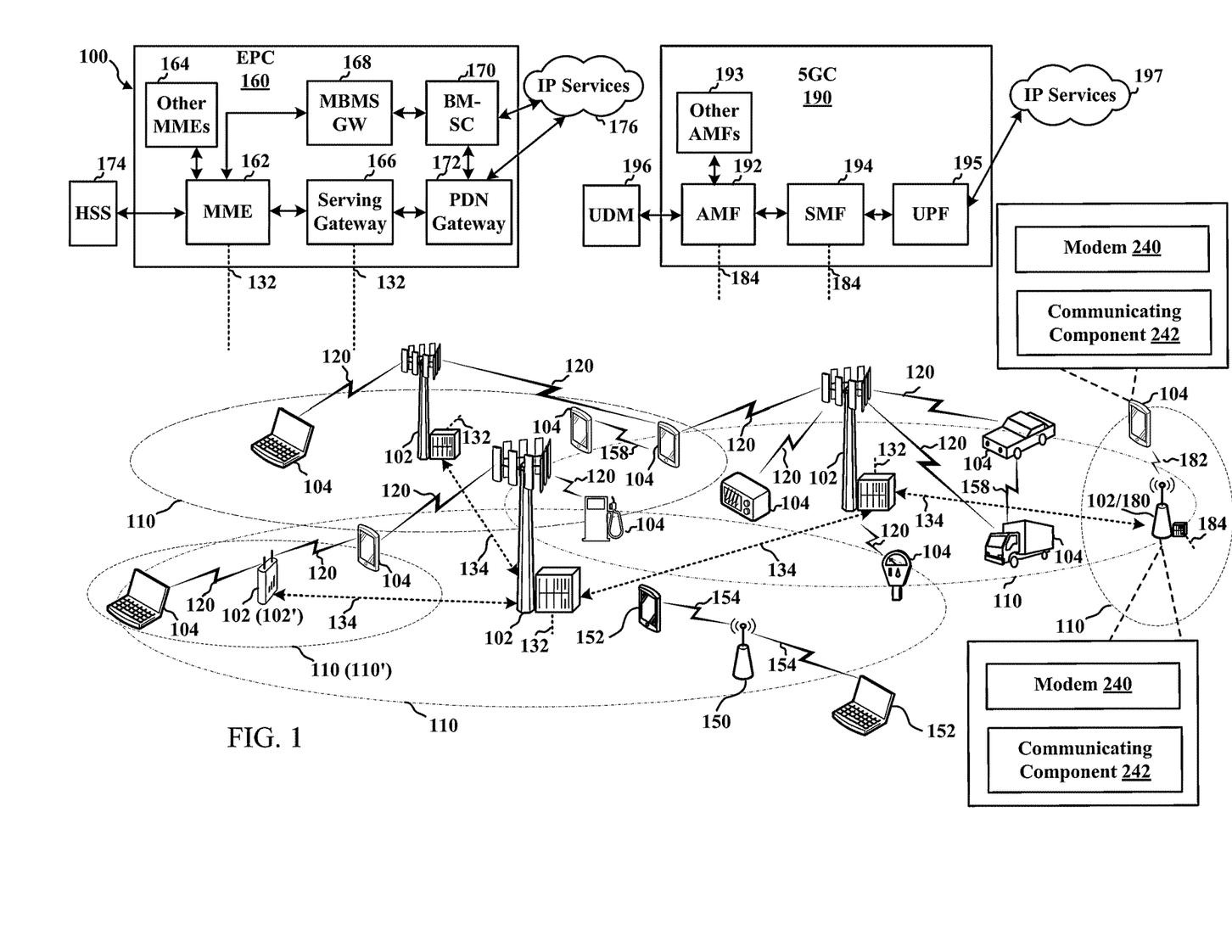
FIG. 1 illustrates an example of a wireless communication system, in accordance with various aspects of the present disclosure.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system, such as a UE 104, base station 102, or other nodes, may have a modem 240 and communicating component 242 for adapting, based on operating bandwidth, conditions or parameters for narrow beam channel access, in accordance with aspects described herein. Though a UE 104 and base station 102 are shown as having the modem 240 and communicating component 242, this is one illustrative example, and substantially any node or type of node may include a modem 240 and communicating component 242 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave.

Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, a communicating component 242 of a base station 102 or UE 104 can adapt, based on an operating bandwidth, parameters or conditions for performing narrow beam channel access. For example, if the bandwidth-adapted parameters or conditions indicate that narrow beam channel access is permitted, communicating component 242 can transmit signals using narrow beams without first performing LBT. If bandwidth-adapted parameters or conditions indicate that narrow beam channel access is not permitted, communicating component 242 can perform LBT to acquire a channel before transmitting the signal (and/or can otherwise refrain from transmitting the signal, attempt to select a different beam, etc.).

Figure 3:
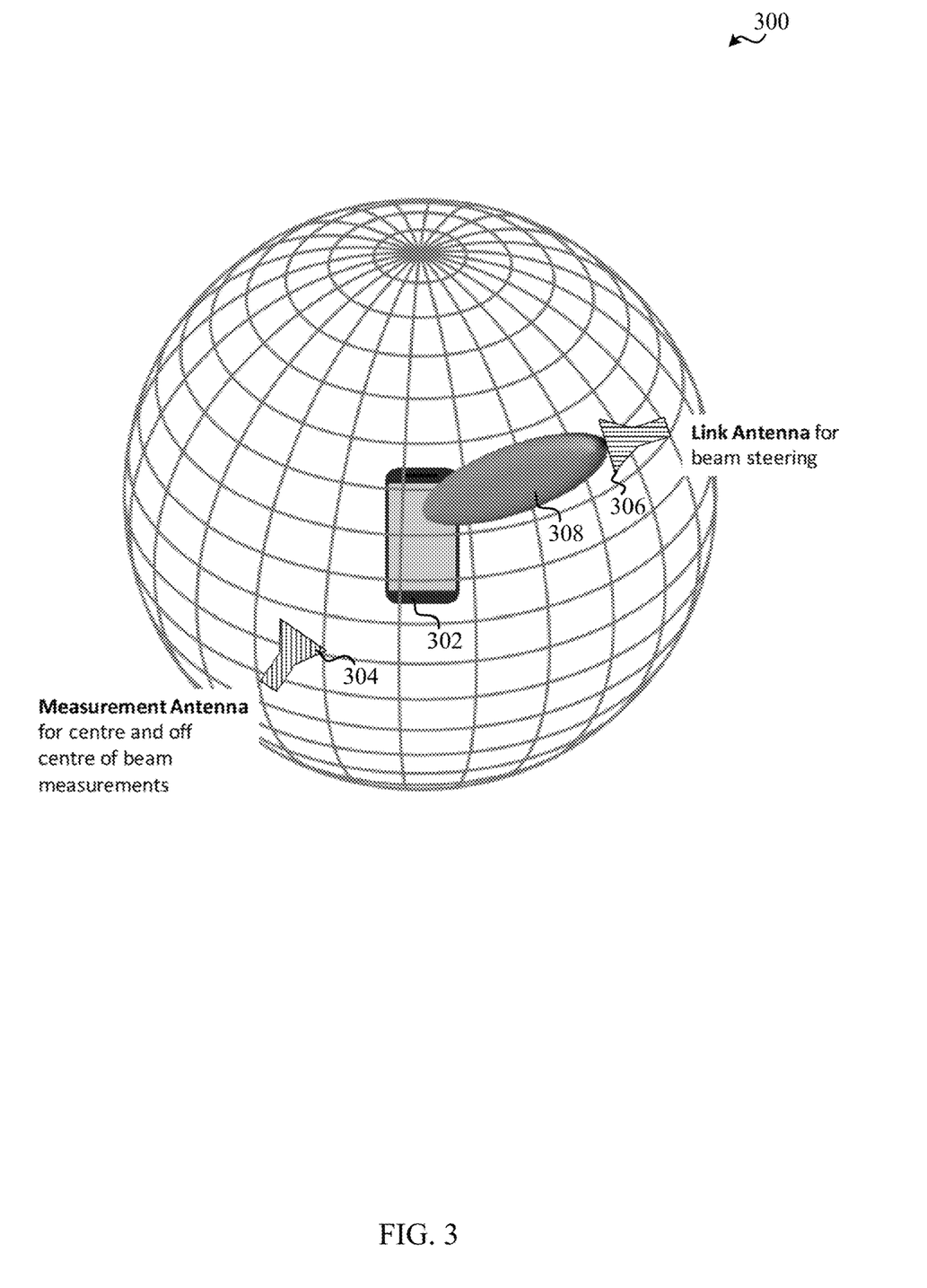
FIG. 3 illustrates an example of a spherical measurement test that can be performed for a device, in accordance with various aspects of the present disclosure.
Figure 4:
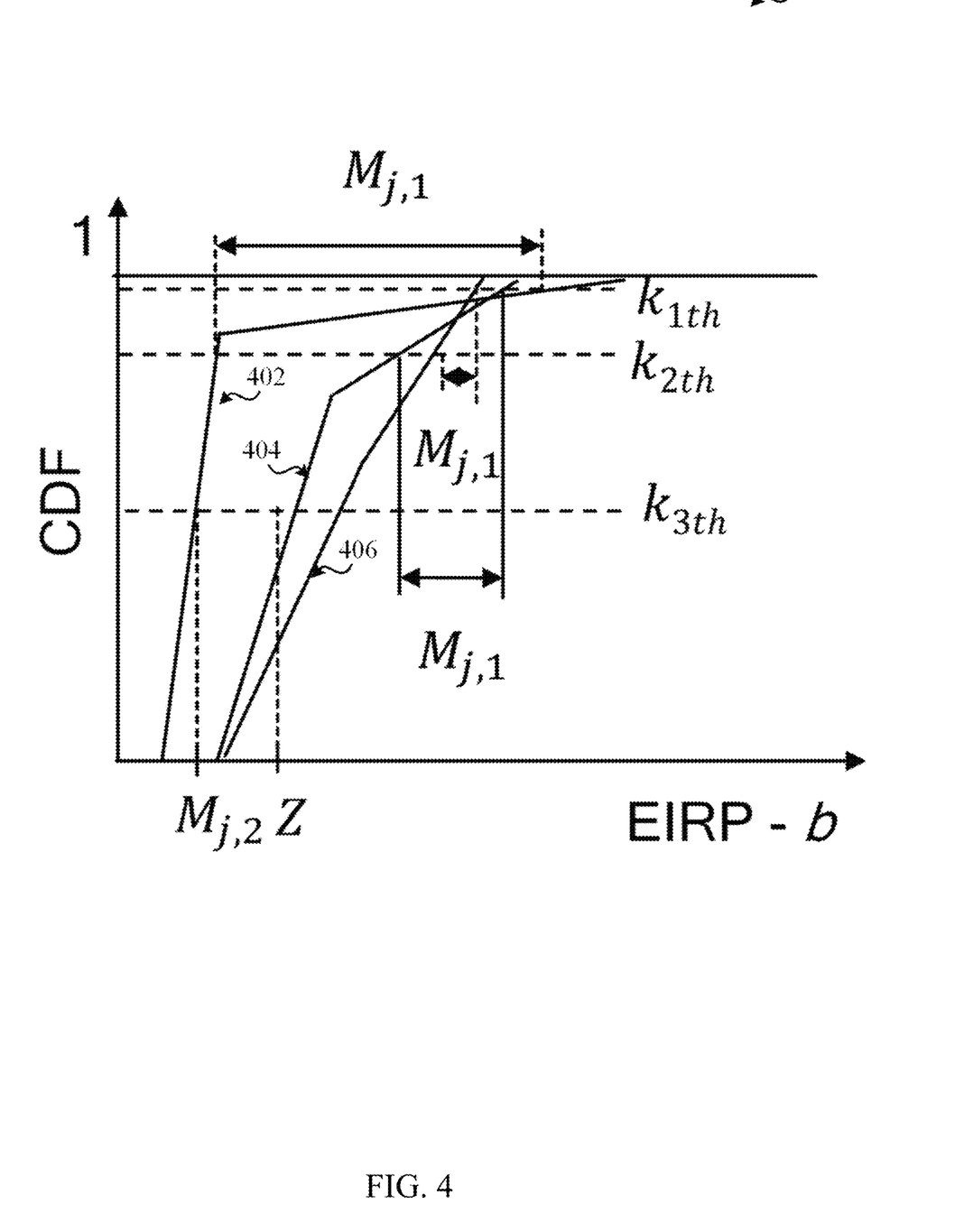
FIG. 4 illustrates an example of a graph of a cumulative distribution function (CDF) of spherical measurement test results, in accordance with various aspects of the present disclosure.
Figure 5:
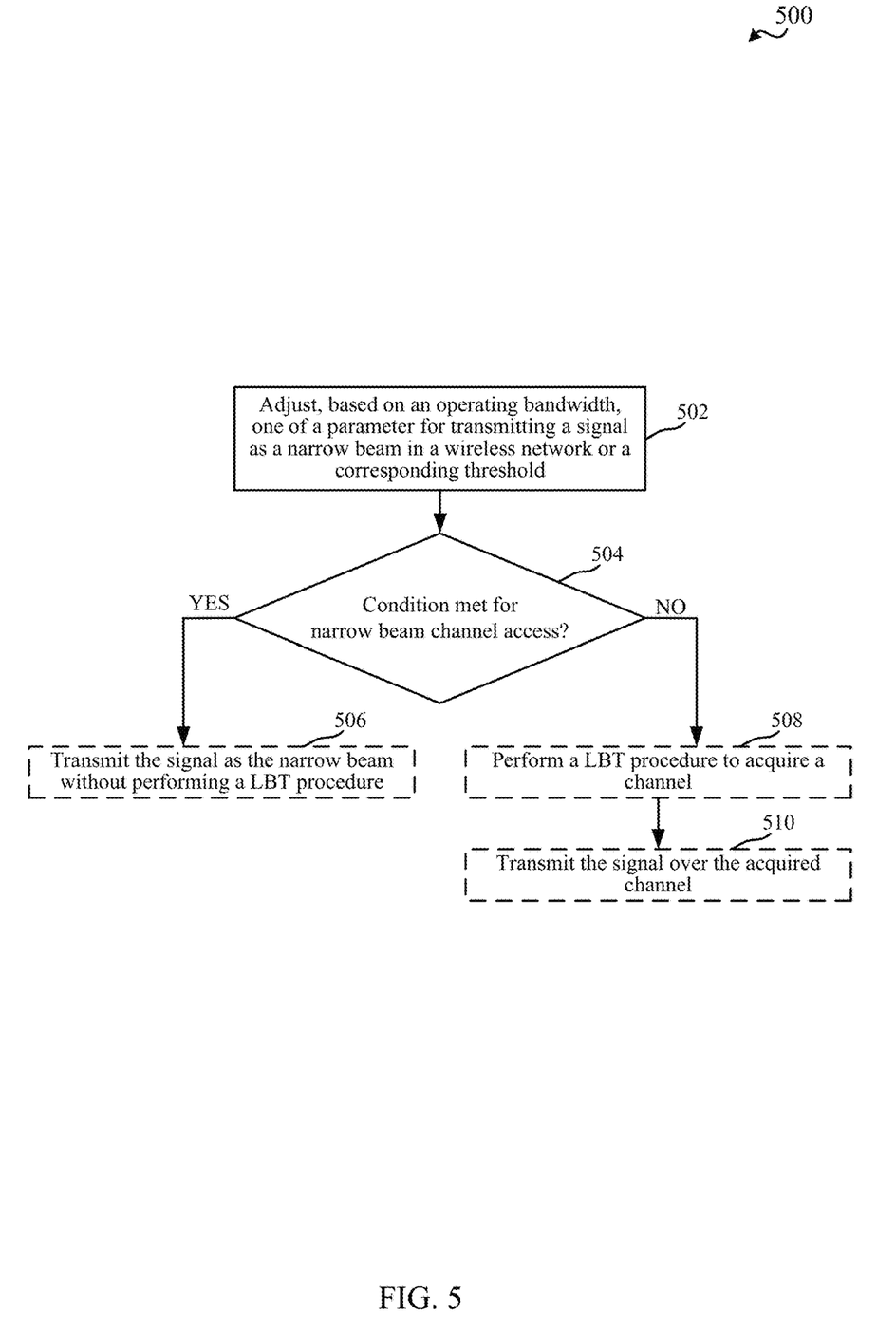
FIG. 5 is a flow chart illustrating an example of a method for adjusting, based on an operating bandwidth, a parameter or threshold or condition for narrow beam channel access, in accordance with aspects described herein.

Turning now to FIGS. 2-6, aspects are depicted with reference to one or more components and one or more methods that may perform the actions or operations described herein, where aspects in dashed line may be optional. Although the operations described below in FIG. 5 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Figure 2:
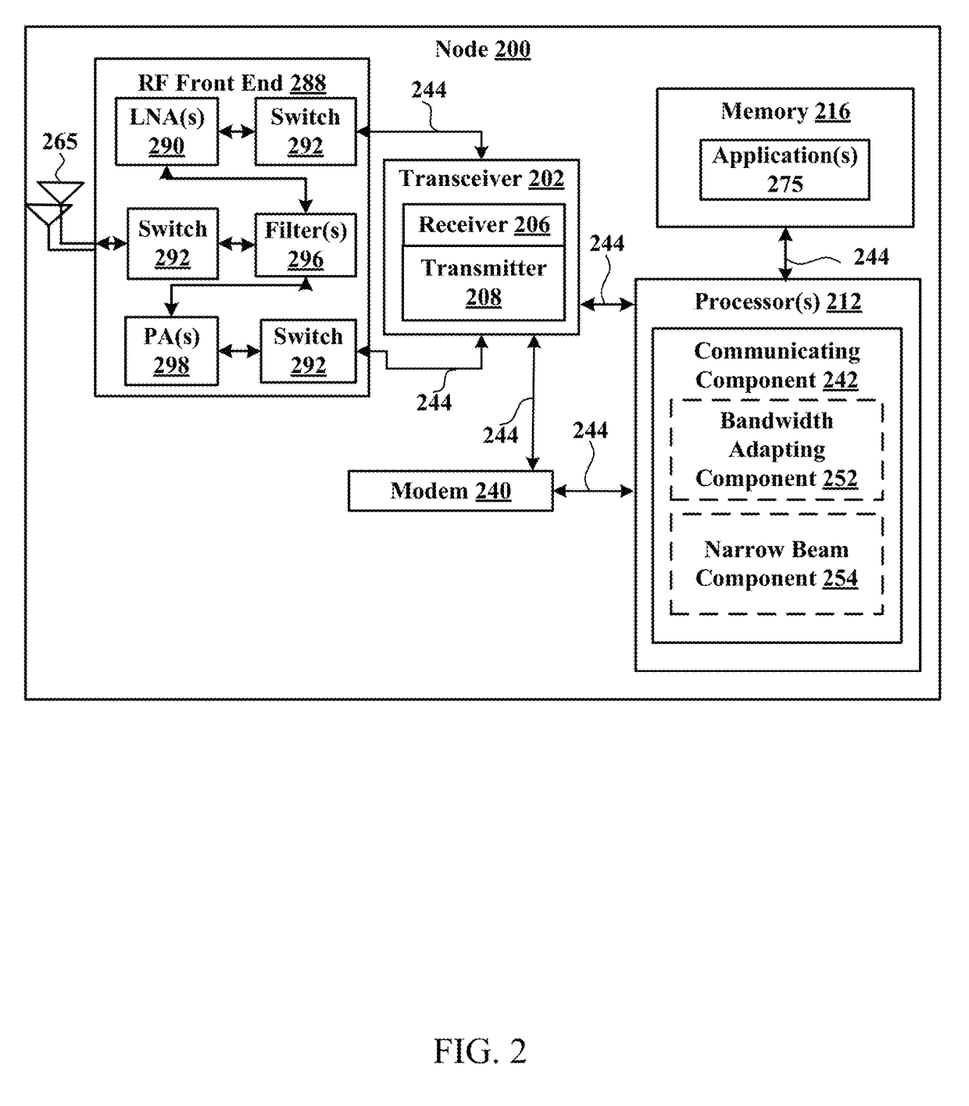
FIG. 2 is a block diagram illustrating an example of a node for wireless communications, in accordance with various aspects of the present disclosure.

Referring to FIG. 2, one example of an implementation of node 200 for wireless communications is illustrated, which may include a base station 102, a UE 104, or another node, as described above. Node 200 may include a variety of components, some of which have already been described above and are described further herein, including components such as one or more processors 212 and memory 216 and transceiver 202 in communication via one or more buses 244, which may operate in conjunction with modem 240 and/or communicating component 242 for adapting, based on operating bandwidth, conditions or parameters for narrow beam channel access, in accordance with aspects described herein.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when node 200 is operating at least one processor 212 to execute communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, node 200 may include RF front end 288, which may operate in communication with one or more antennas 265 and transceiver 202 for receiving and transmitting radio transmissions, for example, wireless communications transmitted by at least one base station 102 or wireless transmissions transmitted by node 200. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that node 200 can communicate with one or more other nodes, for example, one or more base stations 102 or one or more cells associated with one or more base stations 102, one or more UEs 104, etc. In an aspect, for example, modem 240 can configure transceiver 202 to operate at a specified frequency and power level based on the configuration of the node 200 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of node 200 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on configuration information associated with node 200 as provided by the network during cell selection and/or cell reselection.

In an aspect, communicating component 242 can optionally include a bandwidth adapting component 252 for adapting narrow beam channel access parameters or conditions, and/or a narrow beam component 254 for transmitting a narrow beam with or without performing LBT based on the bandwidth-adapted parameters or conditions, in accordance with aspects described herein.

In an aspect, the processor(s) 212 may correspond to one or more of the processors described in connection with the UE in FIG. 6. Similarly, the memory 216 may correspond to the memory described in connection with the UE in FIG. 6.

FIG. 3 illustrates an example of a spherical measurement test 300 that can be performed for a device 302. For example, a measurement antenna 304 can be positioned to measure center and off-center beam measurements, and a link antenna 306 can be used for beam steering to steer beams 308 from the device 302. Using the spherical measurement test 300, for example, metrics that describe the narrowness aspect of beam can be defined based on spherical effective isotropic radiated power (EIRP) measurements measured in a sphere around the device 302. For example, metrics can be defined based on statistics of EIRP measurements around the device 302 under test.

FIG. 4 illustrates an example of a graph of a cumulative distribution function (CDF) of spherical measurement test results 400. For example, test results 400 show a line representing CDF of EIRP values for three different beams, shown at lines 402, 404, 406. For example, considering EIRP measurements minus constant b at different percentiles (e.g., $k_{1th}$, $k_{2th}$, $k_{3th}$, where $k_3<k1$, $k2<k1$) of the distribution of radiated power measured over the full sphere around the device 302, while the device 302 is configured with beam j. In an example, $M_{j,1}=k_{1th}\cdot\text{tile}(\{EIRP_i: i\in E_j\})-k_{2th}\cdot\text{tile}(\{EIRP_i: i\in E_j\})$ where $E_j$ is the set of EIRPs captured in spherical measurement for beam j, and $M_{j,2}=k_{3th}\cdot\text{tile}(\{EIRP_i-b: i\in E_j\})$ where $E_j$ is the set of EIRPs captured in spherical measurement for beam j and b is a constant (e.g., maximum transmit power). In an example, in graph 400, $M_{j,2}$ can express antenna gain at the device 302.

Currently, for narrow beam channel access, a device can pass the narrow beam condition for beam j based on one or more of the following criteria: (1) if total transmit power is less than a predefined threshold, Y; (2) if $M_{j,1}$ is greater than a predefined threshold, X; and/or (3) if $M_{j,1}$ is greater than a predefined threshold, X, or $M_{j,2}$ is less than a threshold, Z. As described, however, base stations and UEs are more probably to adapt and change their operating bandwidth (BW) over time. While base stations can have sharp narrow beams, base station may utilize wide beam to send broadcast messages or initial access related channels. In such a case, base station may fail narrow beam LBT-exempt condition and may conduct LBT (assuming narrow beam condition is agnostic to BW). UE's beam can be wider, and, thus, UE can fail the narrow beam LBT-exempt channel access condition. As a result, UE may conduct LBT before starting uplink transmission in order to avoid interference with other devices sharing the wireless medium (assuming narrow beam condition is BW agnostic). Although the narrow beam condition cannot be met, the resultant interference when operating with wide beam but large bandwidth can be tolerable (interference per spectrum, e.g., decibel milliwatts per hertz (dBm/Hz) is small).

One example of a collision scenario may include a first base station (BS1) sending downlink (DL) message to a first UE (UE1) and a second UE (UE2) sending uplink (UL) message to a second base station (BS2). Where UE2 transmits over a larger bandwidth (e.g., 100 Mhz compared to BS1 transmitting at 20 MHz), UE1 receives less interference (e.g., dBm/Hz) because UE2's power per spectrum is smaller (assume UE2's power is maximum and same in both cases). As such, the nodes may benefit from normalizing parameters and condition for narrow beam channel access based on operating bandwidth.

FIG. 5 illustrates a flow chart of an example of a method 500 for adjusting, based on an operating bandwidth, a parameter or threshold or condition for narrow beam channel access, in accordance with aspects described herein. In an example, a node 200 can perform the functions described in method 300 using one or more of the components described in FIGS. 1 and 2.

In method 500, at Block 502, one of a parameter for transmitting a signal as a narrow beam in a wireless network or a corresponding threshold can be adjusted based on an operating bandwidth. In an aspect, bandwidth adapting component 252, e.g., in conjunction with processor(s) 212, memory 216, transceiver 202, communicating component 242, etc., can adjust, based on the operating bandwidth, one of the parameter for transmitting the signal as a narrow beam in a wireless network or the corresponding threshold. For example, bandwidth adapting component 252 can multiply the parameter value or threshold by the operating bandwidth to generate a bandwidth-adjusted or bandwidth-adapted parameter value or threshold. In another example, bandwidth adapting component 252 can select the parameter value or threshold (e.g., from a list of values or thresholds corresponding to different operating bandwidths) based on the operating bandwidth to obtain a bandwidth-specific parameter value or threshold. For example, the operating bandwidth for a UE 104 can be a bandwidth configured by the base station 102 for communicating with the base station 102. The operating bandwidth for the base station 102 can be a bandwidth used by the base station 102 for transmitting certain signals (e.g., a bandwidth for dedicated signals transmitted to a UE 104, a bandwidth for broadcast signals, etc.).

In method 500, at Block 504, it can be determined whether a condition for narrow beam channel access is met. In an aspect, narrow beam component 254, e.g., in conjunction with processor(s) 212, memory 216, transceiver 202, communicating component 242, etc., can determine whether the condition for narrow beam channel access is met. For example, narrow beam component 254 can determine whether the condition is met based on the parameter value or threshold adjusted based on the operating bandwidth.

In one example, bandwidth adapting component 252 can adjust a transmit power and/or a threshold for a transmit power of the device by the operating bandwidth. For example, bandwidth adapting component 252 can multiply the transmit power and/or the threshold by the operating bandwidth or by some factor based on the operating bandwidth (e.g., a proportion of the operating bandwidth to a maximum possible operating bandwidth). In this example, narrow beam component 254 can determine that the node passes the narrow beam condition for beam j, if bandwidth-normalized transmit power is less than a predefined threshold, $\tilde{Y}$.

In another example, a narrow beam metric, as described above, may be adjusted based on the operating bandwidth. For example, bandwidth adapting component 252 can adjust a difference between a first percentile of a CDF for EIRP measurements for the narrow beam and a second percentile of the CDF for EIRP measurements for the narrow beam, which may include multiplying the difference by the operating bandwidth or by some factor based on the operating bandwidth (e.g., a proportion of the operating bandwidth to a maximum possible operating bandwidth). For example, $\tilde{M}_{j,1}=k_{1th}$ percentile($\{\widetilde{EIRP_i}: i\in E_j\}$)$-k_{2th}$ percentile($\{\widetilde{EIRP_i}: i\in E_j\}$) where $E_j$ is the set of EIRPs captured in spherical measurement for beam j and normalized by the operating bandwidth. In this example, narrow beam component 254 can determine that the node passes the narrow beam condition for beam j, if $\tilde{M}_{j,1}*BW$ is greater than a predefined threshold, $\tilde{X}$, where BW is the operating bandwidth.

In another example, bandwidth adapting component 252 can adjust a percentile of a CDF of EIRP measurements for the narrow beam, which may include multiplying the percentile by the operating bandwidth or by some factor based on the operating bandwidth (e.g., a proportion of the operating bandwidth to a maximum possible operating bandwidth). For example, $\tilde{M}_{j,2}=k_{3th}$ percentile($\{\widetilde{EIRP_i}-b: i\in E_j\}$) where $E_j$ is the set of EIRPs captured in spherical measurement for beam j and normalized by the operating bandwidth, and b is a constant (e.g., maximum transmit power). In this example, narrow beam component 254 can determine that the node passes the narrow beam condition for beam j, if $\tilde{M}_{j,1}*BW$ is greater than a predefined threshold, $\tilde{X}$, or $\tilde{M}_{j,2}*BW$ is less than a predefined threshold, $\tilde{Z}$, where BW is the operating bandwidth.

In another example, as described, bandwidth adapting component 252 can adjust the threshold to which the parameter value is compared based on the operating bandwidth. For example, bandwidth adapting component 252 can select a bandwidth-specific threshold that corresponds to the operating bandwidth. In one example, the bandwidth-specific threshold can be a transmit power threshold, a threshold corresponding to a difference between a first percentile of a CDF for EIRP measurements specific for the operating bandwidth and a second percentile of the CDF for EIRP measurements specific for the operating bandwidth, a threshold corresponding to a single percentile of a CDF for EIRP measurements specific for the operating bandwidth, etc. In a specific example, narrow beam component 254 can determine that the node passes the narrow beam condition for beam j based on one or more of the following criteria: (1) if total transmit power is less than a predefined threshold, $Y_B$, where $Y_B$ is specified based on operating bandwidth; (2) if $M_{j,1}$ is greater than a predefined threshold, $X_B$, where $X_B$ is specified based on operating bandwidth; and/or (3) if $M_{j,1}$ is greater than a predefined threshold, $X_B$ or $M_{j,2}$ is less than a threshold, $Z_B$, where $X_B$ and $Z_B$ are specified based on operating bandwidth.

In another example, bandwidth adapting component 252 can adapt the narrow beam condition threshold(s) $X_{Thresh}$, e.g., $X_B$, $Y_B$, and $Z_B$, based on operating bandwidth. For example, bandwidth adapting component 252 can adapt one or more of the thresholds based on a constant, transmit power, maximum EIRP value (e.g., captured during a spherical coverage test), etc. In one example, bandwidth adapting component 252 can adapt the an $X_{Thresh}$ value as:

$$X_{Thresh} = \alpha + P_{max} - EIRP_{max} + 10 \log BW$$

where $\alpha$ is a constant, $P_{max}$ is a maximum transmit power, $EIRP_{max}$ is a maximum EIRP value captured during spherical coverage test for the node, and BW is an operating bandwidth. In another example, bandwidth adapting component 252 can adapt the an $X_{Thresh}$ value as:

$$X_{Thresh} = \max\left\{\min\left\{\begin{array}{c}\alpha_1 + 10\log(BW)\\ \alpha_2 + 10\log(BW)\\ 10\log(BW) - \kappa + \eta + 10\log BW - P_{tx}\end{array}\right\}\right\}$$

where $\alpha_1$, $\alpha_2$, $\kappa$, and $\eta$ are constants, $P_{tx}$ is a transmit power, and BW is an operating bandwidth.

As described, narrow beam component 254 can compare the parameter values of the narrow beam, which may be adjusted for operating bandwidth, to a threshold, which may be adjusted for operating bandwidth, to determine whether the condition for narrow beam channel access is met. If the condition is met at Block 504, optionally at Block 506, the signal can be transmitted as a narrow beam without performing a LBT procedure. In an aspect, narrow beam component 254, e.g., in conjunction with processor(s) 212, memory 216, transceiver 202, communicating component 242, etc., can transmit the signal as the narrow beam without performing the LBT procedure. For example, narrow beam component 254 can transmit the signal in the corresponding operating band for the node.

If the condition is not met at Block 504, optionally at Block 508, a LBT procedure can be performed to acquire a channel. In an aspect, narrow beam component 254, e.g., in conjunction with processor(s) 212, memory 216, transceiver 202, communicating component 242, etc., can perform the LBT procedure to acquire the channel. For example, narrow beam component 254 can perform a CCA over the channel, transmit a request to send, receiving a clear to send, or other messages to determine when the channel is acquired. Once the channel is acquired, optionally at Block 510, the signals can be transmitted over the acquired channel. In an aspect, narrow beam component 254, e.g., in conjunction with processor(s) 212, memory 216, transceiver 202, communicating component 242, etc., can transmit the signal over the acquired channel (e.g., in the operating band).

Figure 6:
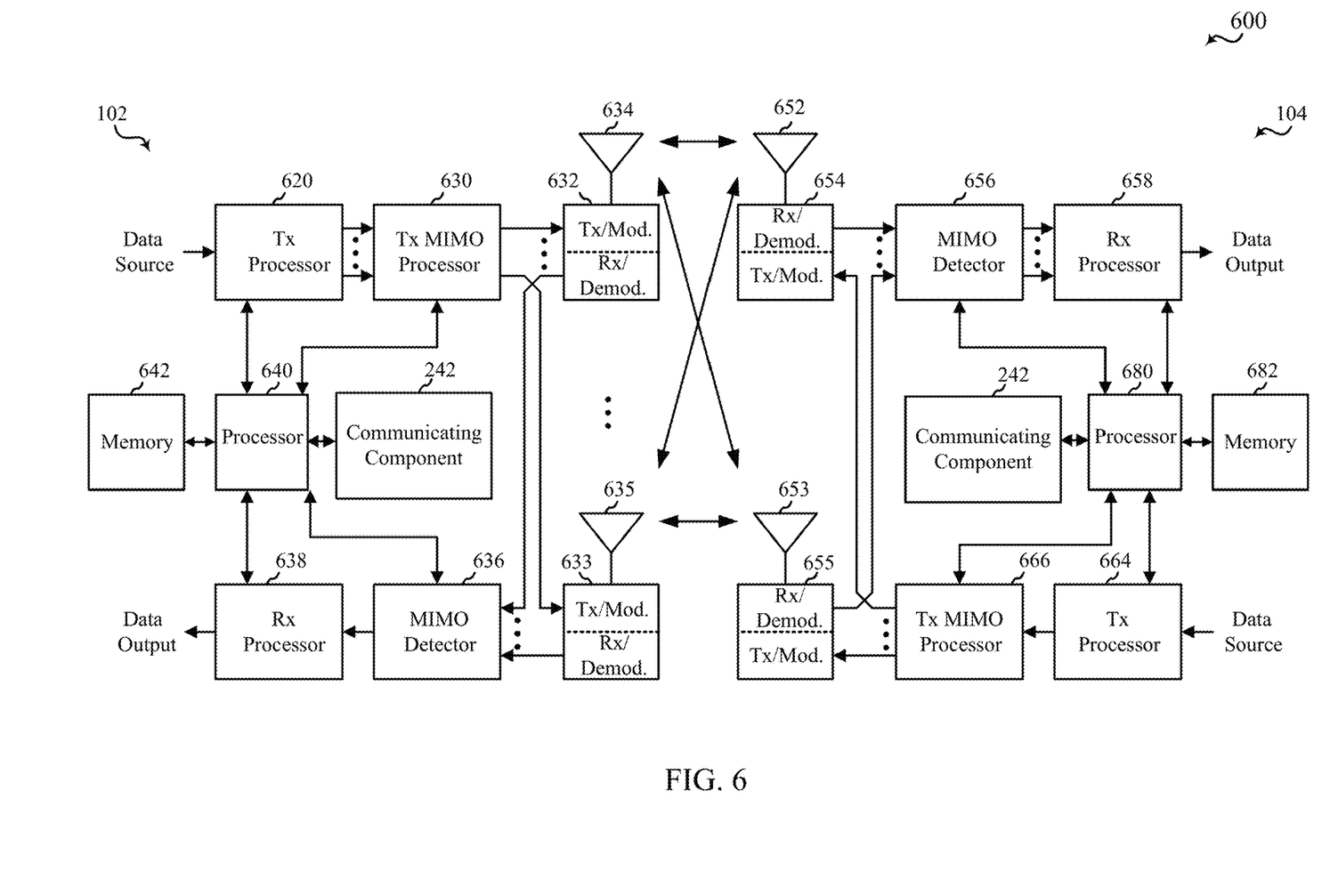
FIG. 6 is a block diagram illustrating an example of a multiple-input multiple-output (MIMO) communication system including a base station and a UE, in accordance with various aspects of the present disclosure.

FIG. 6 is a block diagram of a MIMO communication system 600 including a base station 102 and a UE 104. The MIMO communication system 600 may illustrate aspects of the wireless communication access network 100 described with reference to FIG. 1. The base station 102 may be an example of aspects of the base station 102 described with reference to FIG. 1. The base station 102 may be equipped with antennas 634 and 635, and the UE 104 may be equipped with antennas 652 and 653. In the MIMO communication system 600, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 620 may receive data from a data source. The transmit processor 620 may process the data. The transmit processor 620 may also generate control symbols or reference symbols. A transmit MIMO processor 630 may perform spatial processing (e.g., precoding) on data symbols, control symbols, or reference symbols, if applicable, and may provide output symbol streams to the transmit modulator/demodulators 632 and 633. Each modulator/demodulator 632 through 633 may process a respective output symbol stream (e.g., for OFDM, etc.) to obtain an output sample stream. Each modulator/demodulator 632 through 633 may further process (e.g., convert to analog, amplify, filter, and upconvert) the output sample stream to obtain a DL signal. In one example, DL signals from modulator/demodulators 632 and 633 may be transmitted via the antennas 634 and 635, respectively.

The UE 104 may be an example of aspects of the UEs 104 described with reference to FIGS. 1-2. At the UE 104, the UE antennas 652 and 653 may receive the DL signals from the base station 102 and may provide the received signals to the modulator/demodulators 654 and 655, respectively. Each modulator/demodulator 654 through 655 may condition (e.g., filter, amplify, downconvert, and digitize) a respective received signal to obtain input samples. Each modulator/demodulator 654 through 655 may further process the input samples (e.g., for OFDM, etc.) to obtain received symbols. A MIMO detector 656 may obtain received symbols from the modulator/demodulators 654 and 655, perform MIMO detection on the received symbols, if applicable, and provide detected symbols. A receive (Rx) processor 658 may process (e.g., demodulate, deinterleave, and decode) the detected symbols, providing decoded data for the UE 104 to a data output, and provide decoded control information to a processor 680, or memory 682.

The processor 680 may in some cases execute stored instructions to instantiate a communicating component 242 (see e.g., FIGS. 1 and 2).

On the uplink (UL), at the UE 104, a transmit processor 664 may receive and process data from a data source. The transmit processor 664 may also generate reference symbols for a reference signal. The symbols from the transmit processor 664 may be precoded by a transmit MIMO processor 666 if applicable, further processed by the modulator/demodulators 654 and 655 (e.g., for SC-FDMA, etc.), and be transmitted to the base station 102 in accordance with the communication parameters received from the base station 102. At the base station 102, the UL signals from the UE 104 may be received by the antennas 634 and 635, processed by the modulator/demodulators 632 and 633, detected by a MIMO detector 636 if applicable, and further processed by a receive processor 638. The receive processor 638 may provide decoded data to a data output and to the processor 640 or memory 642.

The processor 640 may in some cases execute stored instructions to instantiate a communicating component 242 (see e.g., FIGS. 1 and 3).

The components of the UE 104 may, individually or collectively, be implemented with one or more ASICs adapted to perform some or all of the applicable functions in hardware. Each of the noted modules may be a means for performing one or more functions related to operation of the MIMO communication system 600. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 600.

The following aspects are illustrative only and aspects thereof may be combined with aspects of other embodiments or teaching described herein, without limitation.

Aspect 1 is a method for wireless communication including adapting one of a parameter for transmitting a signal as a narrow beam in a wireless network or a corresponding threshold based on an operating bandwidth, and based on comparing the parameter with the corresponding threshold, one of performing a LBT procedure to acquire a channel before transmitting the signal as the narrow beam, or transmitting the signal as the narrow beam without performing the LBT procedure.

In Aspect 2, the method of Aspect 1 includes where the adapting includes computing, from the parameter and the operating bandwidth, a bandwidth-normalized parameter.

In Aspect 3, the method of Aspect 2 includes where the bandwidth-normalized parameter is a bandwidth-normalized transmit power for transmitting the signal as the narrow beam.

In Aspect 4, the method of any of Aspects 2 or 3 includes where the bandwidth-normalized parameter is a multiplication of the operating bandwidth and a difference between a first percentile of a CDF for EIRP measurements for the narrow beam and a second percentile of the CDF for EIRP measurements for the narrow beam.

In Aspect 5, the method of any of Aspects 2 to 4 includes where the bandwidth-normalized parameter is a percentile of a CDF of EIRP measurements for the narrow beam multiplied by the operating bandwidth.

In Aspect 6, the method of any of Aspects 1 to 5 includes where the adapting includes selecting, based on the operating bandwidth, the corresponding threshold as a bandwidth-specific threshold, and where comparing includes comparing the parameter with the bandwidth-specific threshold.

In Aspect 7, the method of Aspect 6 includes where the bandwidth-specific threshold corresponds to a transmit power threshold for transmitting the signal as the narrow beam.

In Aspect 8, the method of any of Aspects 6 or 7 includes where the bandwidth-specific threshold corresponds to a difference between a first percentile of a CDF for EIRP measurements for the narrow beam and a second percentile of the CDF specific for the operating bandwidth.

In Aspect 9, the method of any of Aspects 6 to 8 includes where the bandwidth-specific threshold corresponds to a percentile of a CDF of EIRP measurements for the narrow beam multiplied by a bandwidth for transmitting the signal as the narrow beam specific for the operating bandwidth.

In Aspect 10, the method of any of Aspects 1 to 9 includes where the adapting includes computing, based on the corresponding threshold and the operating bandwidth, a bandwidth-normalized threshold, and where comparing includes comparing the parameter with the bandwidth-normalized threshold.

In Aspect 11, the method of Aspect 10 includes where computing the bandwidth-normalized threshold is based on a maximum transmit power for transmitting the signal as the narrow beam and the operating bandwidth.

In Aspect 12, the method of Aspect 11 includes where computing the bandwidth-normalized threshold is further based on a maximum EIRP value.

Aspect 13 is an apparatus for wireless communication including a transceiver, a memory configured to store instructions, and one or more processors communicatively coupled with the memory and the transceiver, where the one or more processors are configured to execute the instructions to cause the apparatus to perform any of the methods of Aspects 1 to 12.

Aspect 14 is an apparatus for wireless communication including means for performing any of the methods of Aspects 1 to 12.

Aspect 15 is a computer-readable medium including code executable by one or more processors for wireless communications, the code including code for performing any of the methods of Aspects 1 to 12.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
a processor;
memory coupled with the processor; and
instructions stored in the memory and operable, when executed by the processor, to cause the apparatus to:
modify, based on an operating bandwidth configured for the apparatus for transmitting signals in a wireless network, a value of one of a parameter or a corresponding threshold for determining whether to transmit a signal as a narrow beam; and
based on comparing the modified value of the parameter with the corresponding threshold or comparing the value of the parameter with the modified corresponding threshold, one of:
perform a listen-before-talk (LBT) procedure to acquire a channel before transmitting the signal as the narrow beam; or
transmit the signal as the narrow beam without performing the LBT procedure.

2. The apparatus of claim 1, wherein the instructions, when executed by the processor, cause the apparatus to modify the value of the parameter at least in part by computing, from the parameter and the operating bandwidth, a bandwidth-normalized parameter.

3. The apparatus of claim 2, wherein the bandwidth-normalized parameter is a bandwidth-normalized transmit power for transmitting the signal as the narrow beam.

4. The apparatus of claim 2, wherein the instructions, when executed by the processor, cause the apparatus to calculate the bandwidth-normalized parameter at least in part by multiplying the operating bandwidth by a difference between a first percentile of a cumulative distribution function (CDF) for effective isotropic radiated power (EIRP) measurements for the narrow beam and a second percentile of the CDF for EIRP measurements for the narrow beam.

5. The apparatus of claim 2, wherein the instructions, when executed by the processor, cause the apparatus to calculate the bandwidth-normalized parameter as a percentile of a cumulative distribution function (CDF) of effective isotropic radiated power (EIRP) measurements for the narrow beam multiplied by the operating bandwidth.

6. The apparatus of claim 1, wherein the instructions, when executed by the processor, cause the apparatus to modify the value of the corresponding threshold at least in part by selecting, based on the operating bandwidth, the corresponding threshold as a bandwidth-specific threshold, and wherein the instructions, when executed by the processor, cause the apparatus to compare the parameter with the bandwidth-specific threshold.

7. The apparatus of claim 6, wherein the bandwidth-specific threshold corresponds to a transmit power threshold for transmitting the signal as the narrow beam.

8. The apparatus of claim 6, wherein the bandwidth-specific threshold corresponds to a difference between a first percentile of a cumulative distribution function (CDF) for effective isotropic radiated power (EIRP) measurements for the narrow beam and a second percentile of the CDF specific for the operating bandwidth.

9. The apparatus of claim 6, wherein the bandwidth-specific threshold corresponds to a percentile of a cumulative distribution function (CDF) of effective isotropic radiated power (EIRP) measurements for the narrow beam multiplied by a bandwidth for transmitting the signal as the narrow beam specific for the operating bandwidth.

10. The apparatus of claim 1, wherein the instructions, when executed by the processor, cause the apparatus to modify the value of the corresponding threshold at least in part by computing, based on the corresponding threshold and the operating bandwidth, a bandwidth-normalized threshold, and wherein the instructions, when executed by the processor, cause the apparatus to compare the parameter with the bandwidth-normalized threshold.

11. The apparatus of claim 10, wherein the instructions, when executed by the processor, cause the apparatus to compute the bandwidth-normalized threshold based on a maximum transmit power for transmitting the signal as the narrow beam and the operating bandwidth.

12. The apparatus of claim 11, wherein the instructions, when executed by the processor, cause the apparatus to compute the bandwidth-normalized threshold further based on a maximum effective isotropic radiated power (EIRP) value.

13. A method for wireless communication at a device, comprising:
modifying, based on an operating bandwidth configured for the device for transmitting signals in a wireless network, a value of one of a parameter or a corresponding threshold for determining whether to transmit a signal as a narrow beam; and
based on comparing the modified value of the parameter with the corresponding threshold or comparing the value of the parameter with the modified corresponding threshold, one of:
performing a listen-before-talk (LBT) procedure to acquire a channel before transmitting the signal as the narrow beam; or
transmitting the signal as the narrow beam without performing the LBT procedure.

14. The method of claim 13, wherein the modifying includes computing, from the parameter and the operating bandwidth, a bandwidth-normalized parameter.

15. The method of claim 14, wherein the bandwidth-normalized parameter is a bandwidth-normalized transmit power for transmitting the signal as the narrow beam.

16. The method of claim 14, wherein computing the bandwidth-normalized parameter include multiplying the operating bandwidth by a difference between a first percentile of a cumulative distribution function (CDF) for effective isotropic radiated power (EIRP) measurements for the narrow beam and a second percentile of the CDF for EIRP measurements for the narrow beam.

17. The method of claim 14, wherein computing the bandwidth-normalized parameter is as a percentile of a cumulative distribution function (CDF) of effective isotropic radiated power (EIRP) measurements for the narrow beam multiplied by the operating bandwidth.

18. The method of claim 13, wherein the modifying includes selecting, based on the operating bandwidth, the corresponding threshold as a bandwidth-specific threshold, and wherein comparing includes comparing the parameter with the bandwidth-specific threshold.

19. The method of claim 18, wherein the bandwidth-specific threshold corresponds to a transmit power threshold for transmitting the signal as the narrow beam.

20. The method of claim 18, wherein the bandwidth-specific threshold corresponds to a difference between a first percentile of a cumulative distribution function (CDF) for effective isotropic radiated power (EIRP) measurements for the narrow beam and a second percentile of the CDF specific for the operating bandwidth.

21. The method of claim 18, wherein the bandwidth-specific threshold corresponds to a percentile of a cumulative distribution function (CDF) of effective isotropic radiated power (EIRP) measurements for the narrow beam multiplied by a bandwidth for transmitting the signal as the narrow beam specific for the operating bandwidth.

22. The method of claim 13, wherein the modifying includes computing, based on the corresponding threshold and the operating bandwidth, a bandwidth-normalized threshold, and wherein comparing includes comparing the parameter with the bandwidth-normalized threshold.

23. The method of claim 22, wherein computing the bandwidth-normalized threshold is based on a maximum transmit power for transmitting the signal as the narrow beam and the operating bandwidth.

24. The method of claim 23, wherein computing the bandwidth-normalized threshold is further based on a maximum effective isotropic radiated power (EIRP) value.

25. An apparatus for wireless communication, comprising:
means for modifying, based on an operating bandwidth configured for the apparatus for transmitting signals in a wireless network, a value of one of a parameter or a corresponding threshold for determining whether to transmit a signal as a narrow beam; and
means for comparing the modified value of the parameter with the corresponding threshold or comparing the value of the parameter with the modified corresponding threshold, and based on the comparing, one of:
performing a listen-before-talk (LBT) procedure to acquire a channel before transmitting the signal as the narrow beam; or
transmitting the signal as the narrow beam without performing the LBT procedure.

26. The apparatus of claim 25, wherein the means for modifying computes, from the parameter and the operating bandwidth, a bandwidth-normalized parameter.

27. The apparatus of claim 25, wherein the means for modifying selects or computes, based on the operating bandwidth, the corresponding threshold as a bandwidth-specific threshold, and wherein the means for comparing compares the parameter with the bandwidth-specific threshold.

28. A non-transitory computer-readable medium, comprising code executable by one or more processors for wireless communication at a device, the code comprising code for:
modifying, based on an operating bandwidth configured for the device for transmitting signals in a wireless network, a value of one of a parameter or a corresponding threshold for determining whether to transmit a signal as a narrow beam; and
comparing the modified value of the parameter with the corresponding threshold or comparing the value of the parameter with the modified corresponding threshold, and based on the comparing, one of:
performing a listen-before-talk (LBT) procedure to acquire a channel before transmitting the signal as the narrow beam; or
transmitting the signal as the narrow beam without performing the LBT procedure.

29. The non-transitory computer-readable medium of claim 28, wherein the code for modifying computes, from the parameter and the operating bandwidth, a bandwidth-normalized parameter.

30. The non-transitory computer-readable medium of claim 28, wherein the code for modifying selects or computes, based on the operating bandwidth, the corresponding threshold as a bandwidth-specific threshold, and wherein the code for comparing compares the parameter with the bandwidth-specific threshold.

* * * * *